(No Model.)

J. W. KREPS.
BARROW WHEEL.

No. 394,703. Patented Dec. 18, 1888.

Witnesses:
J. N. Cooke
Robt. D. Totten

Inventor.
John W. Kreps
By James F. Kay
Attorney

UNITED STATES PATENT OFFICE.

JOHN W. KREPS, OF ALLEGHENY, PENNSYLVANIA.

BARROW-WHEEL.

SPECIFICATION forming part of Letters Patent No. 394,703, dated December 18, 1888.

Application filed February 20, 1888. Serial No. 264,572. (No model.)

*To all whom it may concern:*

Be it known that I, JOHN W. KREPS, a resident of Allegheny, in the county of Allegheny and State of Pennsylvania, have invented a new and useful Improvement in Barrow-Wheels; and I do hereby declare the following to be a full, clear, and exact description thereof.

My invention relates to wheels for wheelbarrows, its object being to form a strong and durable wheel and one which is firmly supported against the side strains in dumping, while, though the mass of it is made of metal, the wheel can be made light and cheap, and at the same time there is a sufficient body of wood in it to yield or spring when necessary, so as to prevent wear on the parts.

The ordinary and almost universal construction of barrow-wheels has been to employ a wooden felly into which the spokes entered, the spokes crossing each other within the hub, and the gudgeon forming the bearings passing directly through the hub, the whole wheel being held together by the tire shrunken thereon. This is the chief form of barrow-wheels; but it is liable to be dashed or broken when side strains are brought upon it, as the only support it has against such strains is the strength of the spokes employed, while the wear on the gudgeon will soon loosen it, so that it comes out of the hub, and the wheel is then worthless. To form stronger wheels, metal spokes have in some cases been employed, but not to any great extent and not with any great success, as they were supported generally by a metal hub, which grasped them in such a way that the side strains on the wheel were liable to dish or bend it, or to bring such heavy strain on the hub as to break it. In my improved wheel I am enabled to support it firmly against side strains, while at the same time, by the employment of a peculiar form of wooden hub, I am enabled to brace the spokes, which can be set at an angle or "staggered," so as to impart strength to the wheel, and any strain from the tire is not only sustained by the bracing of the wheel through the staggering of the spokes, but by the strength and toughness of the wooden hub employed. The exact construction of my improved wheel by which these advantages are obtained will be hereinafter more fully described.

To enable others to make and use my invention, I will describe the same more fully, referring to the accompanying drawings, in which—

Figure 1:
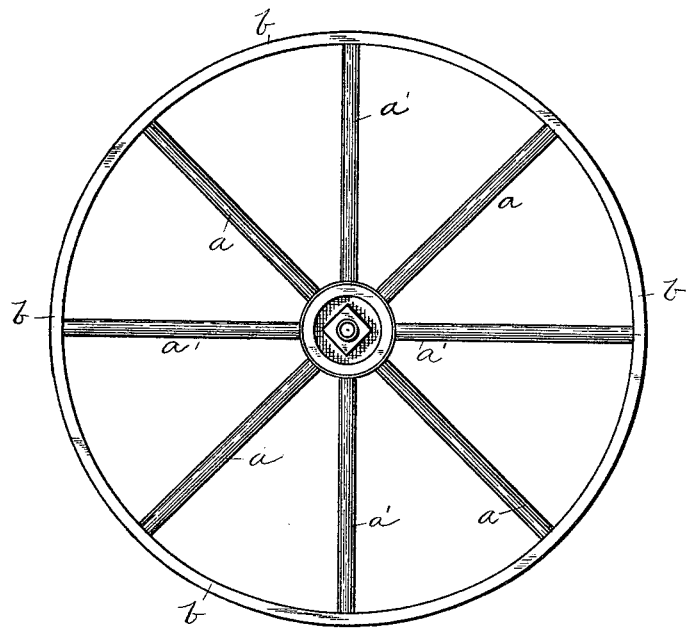
Figure 2:
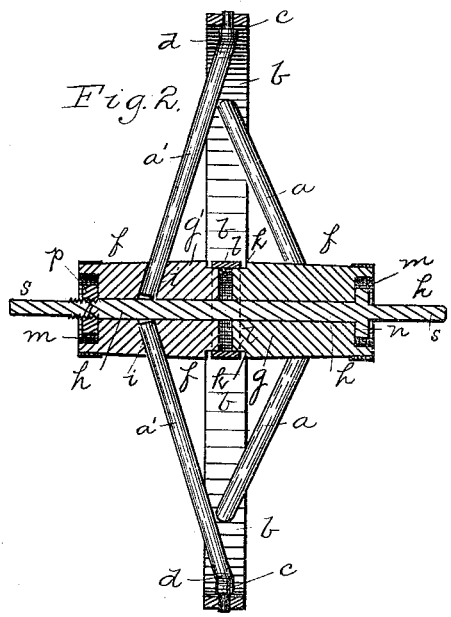
Figure 3:
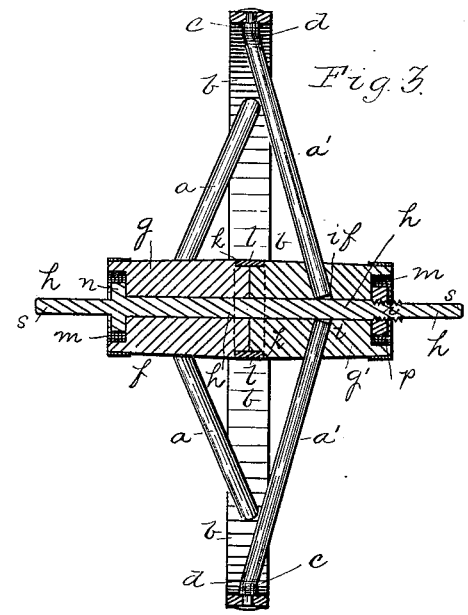

Figure 1 is a side view of my improved barrow-wheel. Fig. 2 is a longitudinal central section of the same, showing the manner of securing it together; and Fig. 3 is a like view of the finished wheel.

Like letters of reference refer to like parts in each.

In forming my improved barrow-wheel I make the tire of metal, the spokes of metal, and the hub of suitable wood—such as locust or white oak—braced by metal bands. In its most improved form the wheel has eight spokes, these spokes $a$ being arranged equidistant from each other and being secured to a wrought-metal tire, $b$, by passing through seats formed therein, the spokes either being riveted to the tire or firmly secured by other means, such as by screwing into seats therein. The best means of securing these spokes in place is shown in the accompanying drawings, the end of each spoke being first slightly upset, as at $c$, to form a shoulder thereon, which fits against the inner surface of the tire when the spoke passes through the seat in the tire, the teat or lug rising above said shoulder being riveted down on the outer surface of the tire, which, if desired, may be slightly recessed to receive it. Just below this shoulder $c$ the spoke is slightly bent, as at $d$, in order to give it the stagger or outward inclination toward one or the other end of the hub $f$, so as to enable it to brace the wheels. The hub $f$ is generally made of locust or white oak, which woods are found to be durable and at the same time sufficiently yielding to brace the wheel and sustain any very heavy strains brought upon it, though this part of the wheel on account of the peculiar construction thereof is not subjected to any very heavy strains. The hub is formed in two sections, $g$ $g'$, which correspond in shape to each other and are adapted to be forced toward or against each other, as hereinafter described, to form the complete hub.

Extending through each section is the central hole or opening for the reception of the gudgeon or shaft $h$, which forms at the journals of the wheel the journals entering into the bearings at the end of the barrow-arms, and extending diagonally through said hub-sections corresponding to the amount of inclination or "stagger" given to the spokes are the holes or seats $i$ for the inner ends of the spokes, these holes or seats extending through to the central hole, so that when the sections $g\ g'$ of the wheel are brought together the lower or inner ends of the spokes rest upon the gudgeon $h$, and the spokes are therefore braced from the central metal gudgeon to the outer metal tire, and in this way the hub is only required to sustain the ordinary strain of a slight side movement of the spokes, if any. Each section of the hub is provided with four of these seats $i$, and each alternate spoke enters the same hub, as shown, the spokes $a$ entering the seats $i$ in the hub-section $g$ and the spokes $a'$ entering the seats $i$ in the hub-section $g'$.

The inner edges of the hub-sections $g\ g'$ are slightly reduced, as at $k$, to receive the metal band $l'$ which acts to brace the center of the hub and at the same time covers the parting between the two sections, and a similar metal band is also shrunken upon the outer end of each of said hub-sections, so as to further brace or strengthen them.

It is well known that the bearing of the ordinary barrow consists, generally, of metal loops extending down from the barrow-arms, and that therefore it is desirable to have a broad face to bear against the barrow-arms and hold the wheel in line, since if the contact of the hub is only with the bearings the entire strain in dumping or side movement of the barrow comes upon said bearing and is liable to break the same or cause the splitting of the arm.

The wooden hub above described has of course these advantages, as it gives the broad bearing of the face, which will hold the barrow-wheel in line between said arms; but in order to secure the wheel together it is evident that some means of pressing the two hub-sections against each other must be employed, this being accomplished in my improved wheel by means of a nut on the gudgeon which passes through the wheel; and in order to preserve said broad surface-bearing for the hub against the barrow-arm I have formed at the outer ends of the hub-sections the annular recess $m$, one recess, as in the hub-section $g$, receiving a collar, $n$, formed on the gudgeon $h$, while the other recess in the hub-section $g'$ receives the nut $p$, which screws onto the threaded portion $r$ of the gudgeon and enters within said seat $m$, so drawing together the two parts or sections of the hub. The ends of the gudgeon $h$ extend out beyond the hubs at $s$, and so form the journals which enter the bearings on the barrow-arms. By so constructing the hub I am enabled to draw together the parts thereof, and at the same time, as all the wear comes against the wooden ends of the hub and the parts by means of which said hub-sections are held together fit within these recesses $m$, there is no liability of the nut $p$ unscrewing from the gudgeon and permitting the wheel to loosen or break.

In forming my improved wheel I first form the parts as above set forth, the spokes being generally inserted in the two sections of the hub and then into the tire, and the teats or projections $e$ passing through the seats in the tire until the shoulders $c$ come against the inner surface thereof, and the parts being then forced together, after which said teats or projections $e$ are upset, so riveting the spokes to the tire. In placing the spokes in the hub-sections $g\ g'$ each alternate spoke is inserted into its seat $i$ in the same hub, as shown in Fig. 2, the central band, $l$, having been first secured in place around the inner ends of said hub-sections and the gudgeon $h$ having been driven through said hub-sections, as shown, the collar $n$ fitting in the annular seat $m$ thereof. After the riveting of the teats of the spokes, the nut $p$ is then screwed upon the gudgeon $h$, so gradually forcing the two hub-sections $g\ g'$ together and at the same time causing the spokes $a\ a'$ to be forced farther into the seats $i$ in the hub-sections, until these spokes rest firmly upon the gudgeon and the two inner faces of the hub-sections bear against each other within the band $l$, when the wheel is finished. As the spokes of the wheel are firmly secured to the tire, it is evident that even if the hub-sections should turn within the band they cannot be drawn out of their seats in the tire, while at the same time, as the lower or inner ends of the spokes have a long bearing in the wooden hub, which will yield or spring slightly on strains brought upon the wheel, it is evident that the liability of breaking either the spokes or hub-body is reduced to a minimum, the employment of this wooden hub overcoming great objections which are usually found in metallic hubs subjected to any such strains. At the same time the parts of the hub are forced together and are held firm and stiff by the frictional contact upon the hub-sections against each other or the bracing of the central band, $l$, the gudgeon passing centrally through them, further bracing them, while at the same time, as the spokes rest upon the gudgeon within the hub, it is evident that they still further act to brace and protect the wheel, which by practical use is found to have great durability and strength.

The wheel is comparatively light in weight, is simple in construction, and can be made at a low price, and at the same time it overcomes the great objections heretofore found in the ordinary barrow-wheel.

What I claim as my invention, and desire to secure by Letters Patent, is—

1. In barrow-wheels, the combination of a metallic tire and metallic bars forming spokes firmly secured to said tire, and a hub divided transversely into two equal sections, said hub-sections having seats for the inner ends of the spokes, and a gudgeon passing through the spokes, and means thereon for forcing the ends of the hub-sections in contact with each other, substantially as and for the purpose set forth.

2. In barrow-wheels, the combination of the metallic tire and the metallic bars forming the spokes secured firmly thereto, the hub formed of two sections, $g$ $g'$, having seats therein to receive the inner ends of the spokes and having annular recesses in the outer ends thereof and annular depressions around the inner ends thereof, a central band fitting in said annular depressions, and a gudgeon extending through the hub-sections and provided with a collar fitting in one recess and a nut screwing onto the gudgeon and fitting into the other recess, substantially as and for the purposes set forth.

3. In barrow-wheels, the combination of the hub-sections having annular seats or recesses $m$ in the ends thereof, spokes in said hub-sections, and the gudgeon extending through said hub-sections and provided with a collar fitting into one such recess, and a nut screwing onto the said gudgeon and fitting into the other said recess.

4. In barrow-wheels, the combination of the gudgeon having the collar $n$ and journal extending out beyond the same and the threaded portion at the other end and journals extending out beyond said threaded portion, the nut screwing on said gudgeon, and hub-sections provided with recesses in the end to receive said collar and nut, substantially as and for the purpose set forth.

In testimony whereof I, the said JOHN W. KREPS, have hereunto set my hand.

JOHN W. KREPS.

Witnesses:
JAMES I. KAY,
J. N. COOKE.